3,528,962
PROCESS FOR THE PRODUCTION OF AZODICARBONAMIDE

Hermann Wolz, Karl-Heinz Blöcher, and Adolf Friedrich, Leverkusen, Germany, and Dattatraya Vinayak Kashelikar, Thana, India, assignors to Farbenfabriken Bayer Aktiengesellschaft, Leverkusen, Germany, a corporation of Germany
No Drawing. Filed July 18, 1967, Ser. No. 654,049
Claims priority, application Germany, July 29, 1966, F 49,828
Int. Cl. C07c *107/00;* C07b *3/00*
U.S. Cl. 260—192                                5 Claims

ABSTRACT OF THE DISCLOSURE

A non-catalytic process for oxidizing a hydrazodicarbonamide in aqueous suspension with gaseous chlorine diluted with an inert gas to obtain azodicarbonamides.

---

There are several processes for producing azodicarbonamide, which is widely used as a gas donor in the production of foams from rubbers and plastics, by the oxidation of hydrazodicarbonamide. The oldest and still commonly used process uses chromosulphuric acid. Among its disadvantages are the prohibitive costs of the chromium salts which make their recovery imperative and the high level of toxicity of the effluents containing chromium salts. Because of the above, serious technical problems arise and considerable expense is necessary, particularly for equipment. Oxidation with nitrates in the presence of copper ions as a catalyst can only be carried out in glacial acetic acid or at the least highly concentrated acetic acid, and therefore, is also too expensive as a practical matter for general use. It is also noted that the use of chlorates as oxidizing agents in the presence of ammonium metavanadate as a catalyst is possible. The yield, however (87% of the theoretical value), is also unsatisfactory. Hitherto, oxidation with inexpensive chlorine or sodium hypochlorite has been carried out in high yields only in the presence of bromine or iodine ions (cf. Belgian patent specifications Nos. 627,533 and 631,410).

It has now been found, however, that hydrazodicarbonamide can be oxidized into azodicarbonamide with gaseous chlorine, in the absence both of a catalyst and of an organic solvent provided the chlorine is introduced into an aqueous suspension of the hydrazodicarbonamide diluted with a gas which is inert under reaction conditions.

Examples of gases which are inert under the reaction conditions include air, nitrogen and carbon dioxide. In general, at least one unit by volume of the inert gas is required per unit volume of the chlorine. With a higher chlorine concentration, more secondary products are formed; moreover there is a danger of nitrogen chlorides being formed which can lead to dangerous explosions when present in relatively high concentrations. In addition, it is usually of advantage not to use more than 50 units by volume of the inert gas per unit volume chlorine because, otherwise, the chlorine concentration will be too low. The above reaction can be carried out at temperatures of from 0° C. to approximately 100° C., the preferred temperatures being from 0° C. to 50° C.

The grain size of the azodicarbonamide obtained is governed by the reaction temperatures used, the concentration of the hydrazodicarbonamide in the aqueous suspension and the ratio of the chlorine/inert gas mixture. Relatively high temperatures, relatively high chlorine concentrations and relatively high concentrations of the hydrazodicarbonamide promote the formulation of fairly coarse grains, whilst relatively low temperatures, a high dilution of the chlorine and a low concentration of the hydrazodicarbonamide promote the formation of a fine-grained azodicarbonamide. The required grain size can be obtained by suitably adjusting the reaction conditions.

The reaction can be carried out by introducing a chlorine/air mixture of the required composition into a reaction vessel equipped with a stirring mechanism in which the aqueous suspension of the hydrazodicarbonamide is present. If it is desired to carry out the oxidation reaction quickly, it is advisable to thoroughly distribute the gas in the aqueous dispersion. This can be done, for example, by means of a frit or by means of a suitably designed stirrer, for example a disc stirrer. It has proved to be particularly suitable to use hollow stirrers which automatically suck in the air and distribute it very finely in the aqueous suspension with the chlorine gas admixed therewith.

EXAMPLE 1

8,000 parts by weight of hydrazodicarbonamide were suspended in 27,000 parts by weight of water, a mixture of gaseous chlorine and air (ratio by volume of 1:2) being added with vigorous stirring to the resulting suspension at 30 C., until 4,930 parts of chlorine had been consumed. On completion of oxidation, the suspension of azodicarbonamide was suction-filtered, washed with water until neutral and dried at 50° C.–60° C.

Yield: 7,754 parts by weight of azodicarbonamide =98.5% of the theoretical (hydrazodicarbonamide content less than 0.05%).

Grain size distribution:

5% by weight less than $3\mu$;
10% by weight less than $9\mu$, i.e. 85% between $3\mu$ and $9\mu$; and
50% by weight less than $7\mu$.

EXAMPLE 2

As described in Example 1, a mixture of gaseous chlorine and air in a ratio by volume of 1:10 was added at 45° C. to 4,000 parts by weight of hydrazodicarbonamide and 40,000 parts by weight of water until 2,820 parts by weight of chlorine had been consumed. After suction-filtration and drying, 3,932 parts by weight of azodicarbonamide (=99.7% of the theoretical) were obtained. The hydrazodicarbonamide content was less than 0.05%.

Grain size distribution:

15% by weight less than $8\mu$;
5% by weight less than $16\mu$, i.e. 80% between $8\mu$ and $16\mu$; and
50% by weight less than $15\mu$.

EXAMPLE 3

236 parts by weight of hydrazodicarbonamide and 800 parts by weight of water were oxidised with vigorous stirring at 60° C. by means of a mixture of gaseous chlorine and air in a ratio by volume of 1:40 until 150 parts by weight of the chlorine had been consumed. The product was worked up as described in Example 1.

Yield: 223 parts by weight of azodicarbonamide (100%)=96.1% of the theoretical.

Grain size distribution:

10% by weight less than $13\mu$;
5% by weight less than $44\mu$, i.e. 85% between $13\mu$ and $44\mu$; and
50% by weight less than $31\mu$.

Melting point: 222° C.–223° C.

EXAMPLE 4

A mixture of gaseous chlorine and air in a ratio by volume of 1:1.5 was added with vigorous stirring at 50° C. to 8,000 parts by weight of hydrazodicarbonamide and 27,000 parts by weight of water until 4,925 parts by weight of chlorine had been consumed. After suction filtration and drying, 7,712 parts by weight of azodicarbonamide (=98.0% of the theoretical) were obtained (hydrazodicarbonamide content less than 0.05%).

Grain size distribution:

15% by weight less than $2\mu$;

15% by weight less than $7\mu$, i.e. 70% between $2\mu$ and $7\mu$; and

50% by weight less than $4\mu$.

EXAMPLE 5

A mixture of gaseous chlorine and air in a ratio by volume of 1:1 was added with vigorous stirring at 20° C.–30° C. to 8,000 parts by weight of hydrazodicarbonamide and 27,000 parts by weight of water until 4,875 parts by weight of chlorine had been consumed. The product was worked up as described in the preceding examples.

Yield: 7,658 parts by weight of azodicarbonamide (=97.3% of the theoretical). Hydrazodicarbonamide content: less than 0.05%.

Grain size distribution:

5% by weight less than $3\mu$;

10% by weight less than $10\mu$, i.e. 85% between $3\mu$ and $10\mu$; and

50% by weight less than $6\mu$.

What is claimed is:

1. A process for producing azodicarbonamide comprising contacting an aqueous suspension of a corresponding hydrazodicarbonamide with a reactive amount of gaseous chlorine initially 1–50:1; said reaction being effected at about 0–100° C.

2. The process of claim 1 wherein the inert gas is air.

3. The process of claim 1 wherein the inert gas is nitrogen.

4. The process of claim 1 wherein the inert gas is carbon dioxide.

5. The process of claim 1 wherein the chlorine is introduced with rapid agitation of the reaction mixture.

References Cited

UNITED STATES PATENTS 3,225,026  12/1965  Huibers et al. _____ 260—192

CHARLES B. PARKER, Primary Examiner

C. F. WARREN, Assistant Examiner

U.S. Cl. X.R.

260—687